May 24, 1927.
W. F. STOODY
1,629,748
METHOD OF MAKING WELDING RODS AND THE RESULTING PRODUCT
Filed Jan. 28, 1926
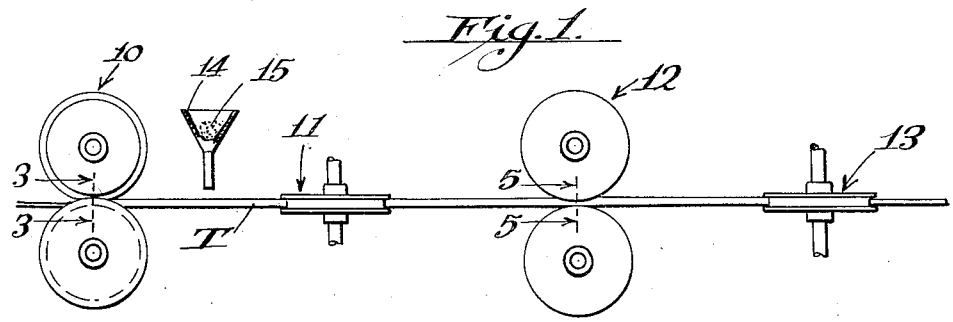
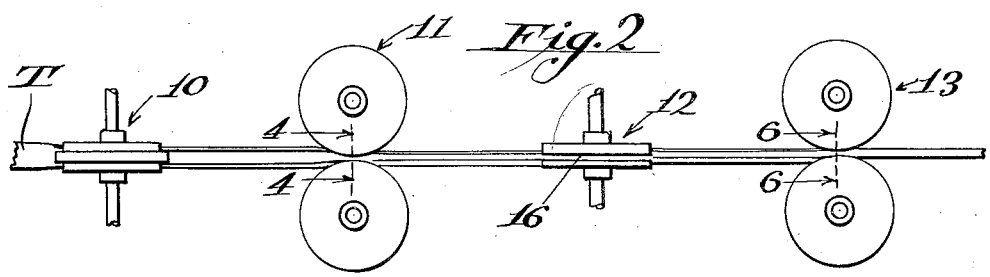
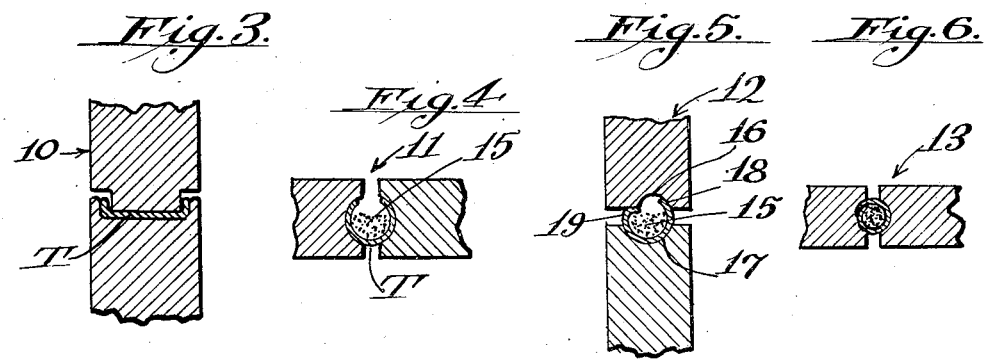
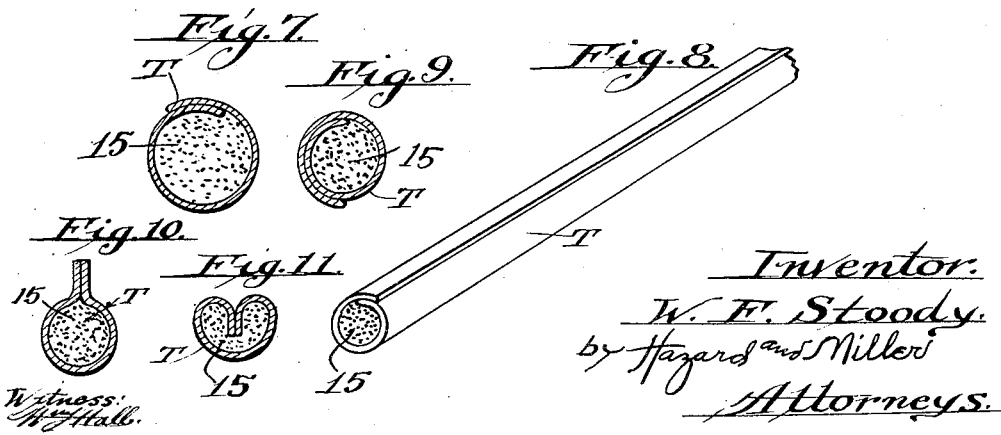
Inventor.
W. F. Stoody.
by Hazard and Miller
Attorneys.
Witness:
W. J. Hall.

Patented May 24, 1927.

1,629,748

UNITED STATES PATENT OFFICE.

WINSTON F. STOODY, OF WHITTIER, CALIFORNIA, ASSIGNOR TO STOODY COMPANY, OF WHITTIER, CALIFORNIA, A CORPORATION OF CALIFORNIA.

METHOD OF MAKING WELDING RODS AND THE RESULTING PRODUCT.

Application filed January 28, 1926. Serial No. 84,419.

This invention relates to an improved method for making welding rods and to an improved welding rod which is the resulting product.

Heretofore several types of welding rods have been constructed including a metallic sheath which encloses an alloy, flux or other material desirable in welding. These alloys, fluxes or other materials are usually in the sheath in the form of a powder or paste, and the sheath is rolled around the powder or paste either by dies or rolls so as to enclose it. When the sheath is made of a single strip of metallic tape, it is usually in the form of a tube, the side edges being either abutting or somewhat spaced apart. Because of the fact that the material which is enclosed is in the form of a powder or paste, it is difficult to form the tape into a tube and cause the tape to be pressed against it, because of the fact that the enclosed material shifts when the pressure is applied. It is desirable, however, that the filler or enclosed material be tightly held in the tube by the sheath. Consequently, heretofore it has been common practice to position a wire core within the tube before it is completely closed. This wire core serves several functions. One of these is to supply the desired amount of iron and another is to afford a comparatively stiff body within the tube against which the edges of the sheath may be pressed, permitting the sheath to tightly enclose the filler.

An object of this invention is to provide an improved method whereby the filler may be enclosed within the sheath and tightly held in place therein without requiring the insertion of a wire core to afford the stiff body against which the sheath may be pressed in closing it.

Another object of this invention is to provide an improved method for forming welding rods whereby the quantity of the filler in the sheath may be varied.

In certain kinds of welding it is desirable to vary the amount of alloy, and heretofore because of the fact that the side edges of the sheath were either abutting or very nearly so, it has been practically impossible to vary materially the quantity of filler which is positioned within it without at the same time changing the size of the tape which was used in forming the sheath.

The improved method permits the same size of tape to be used under all circumstances and also permits the quantity of filler positioned within it to be varied, at the same time allowing the sheath to be tightly wrapped around the filler, so as to hold it tightly in position therein.

A further object of this invention is to provide an improved welding rod which is produced by the improved method and which is different in form from welding rods heretofore provided.

With the foregoing and other objects in view which will be made manifest in the following detailed description and specifically pointed out in the appended claims, reference is had to the accompanying drawings for an illustrative embodiment of the invention, wherein:

Figure 1 may be considered as a diagrammatic view in side elevation illustrating the manner in which the improved welding rod is formed, Fig. 2 may be considered as a top plan view of the construction shown in Fig. 1, Fig. 3 is a vertical section taken on the line 3—3 of Fig. 1, Fig. 4 is a vertical section taken on the line 4—4 of Fig. 2, Fig. 5 is a vertical section taken on the line 5—5 of Fig. 1, Fig. 6 is a vertical section taken on the line 6—6 of Fig. 2, Fig. 7 is a vertical section through the improved welding rod illustrated as being formed by the construction shown in Figs. 1 to 6 inclusive, Fig. 8 is a perspective view of the rod shown in Fig. 7, Fig. 9 is a vertical section through the rod of a slightly modified form, Fig. 10 illustrates a further modification, and Fig. 11 illustrates another modification.

Referring to the accompanying drawings wherein similar reference characters designate similar parts throughout, the improved rod is preferably formed by means of rolls, although it will be readily understood that dies or other forming devices can be substituted therefor. In the present instance four sets of rolls are illustrated, although the number and their arrangement can also be varied. These sets are indicated at 10, 11, 12 and 13 respectively. The rolls 10 and 12 are preferably arranged vertically, so that they rotate about horizontal axes, while the rolls 11 and 13 are rotatable about vertical axes. Between the various sets of rolls a metallic tape T, such as a soft steel ribbon is fed. The first set of rolls 10 are so constructed that they turn up the side edges of the tape so as to trough it, as clearly illustrated in Fig. 3. Between the first and second sets of rolls 10 and 11 there is arranged a feeding mechanism, represented by the funnel 14, which feeds the material which is desirable in welding or the filler 15 onto the troughed tape T.

This material may be either in the form of a paste or powder and preferably has arc sustaining qualities. Either ferrous alloys or a material which will change the composition of the deposit, a flux or a material which will aid in refining the metal as it is being welded, or any combination of these, can be employed.

After the material has been deposited on the troughed tape, the tape passes through the rolls 11, which tend to round up the sides of the tape so as to partially enclose the deposited material. After having passed through the rolls 11, the tape then passes between the rolls 12. The construction of these rolls is clearly indicated in Fig. 5. Both the rolls have grooves on their peripheral surfaces, but the groove 16 on the upper roll is narrower than the groove 17 on the lower roll, and is offset with respect to it. When the tape passes through these rolls, the edge 18 of the tape extends upwardly into the groove 16, while the edge 19 is flattened down on engaging the peripheral surface of the upper roll. The tape then is caused to pass between the last set of rolls 13, which set of rolls cause the edge 18 to overlap the edge 19 and to be firmly pressed against it.

This method of causing one side edge to overlap the other side edge and to be pressed against it is one of the most important features of the invention. Because of this it is possible to completely omit the wire core which has heretofore been employed for the reason that the edge 19 forms a relatively stiff body against which the edge 18 can be pressed. It will also be noted that this method permits the quantity of filler 15 to be varied. If a large quantity of filler is desired, the improved rod will assume the form illustrated in Figs. 6, 7 and 8 with the edges 18 and 19 overlapping each other but slightly. If a smaller amount of filler 15 is desired, the edges of the tape will be caused to overlap each other materially so that the rod will assume the form illustrated in Fig. 9. Obviously, it is possible to cause the metallic sheath or tape to be formed into a tube of two thicknesses or more by reducing the quantity of filler and passing the tube through additional rolls. In this manner it is possible to use the same sized tape T for all classes of rods and vary the percentage of alloy or the quantity of the filler. At the same time it will be noted that as the metallic tape is tightly rolled around the filler, the filler will be maintained in place therein and will not drop out during the welding. Furthermore, there will be no cracks or crevices between abutting edges through which the filler might leak.

Figs. 10 and 11 illustrate slightly modified forms of the improved welding rod. These welding rods can be formed in a similar manner to that in which the welding rods illustrated in Figs. 7, 8 and 9 are formed, it being merely necessary to slightly change the forms of the rolls or the dies, as the case may be, in order to produce them. In the modification shown in Fig. 10 the portions of the metallic tape adjacent its side edges are caused to assume a position side by side, and in that sense they might be considered as being lapping. In forming this welding rod the quantity of filler or the material desirable in welding can be very easily varied, permitting the same size of tape to be used, it being understood that when a small quantity of filler is employed, the portions of the tape adjacent its side edges which are in contact will be greater than that shown, whereas if the quantity of filler is increased, the portions of the tape adjacent the side edges which are in contact will be decreased.

Fig. 11 also illustrates a welding rod which can be formed by the improved method and which will also permit the same size of tape to be used, while the contents or filler can be varied in quantity. In this modification the side edges 18 and 19 of the tape are other than abutting and have portions of the tape adjacent them which are in contact, these portions which are in contact being greater when the filler is small and smaller when the filler is great.

From the above described method it will be readily appreciated that it is possible to completely eliminate or omit the wire core and at the same time to completely fill the interior of the sheath with that material which is desirable. The method permits the quantity of the filler to be varied very easily and at the same time causes the filler to always be firmly held within the sheath regardless of its quantity. While the improved method makes it possible to omit the wire core, such wire core can be inserted with the material if it is desired that there be additional iron present. From an inspection of Figs. 7 to 11 inclusive, it will be noted that the improved welding rod takes the form of a tubular metallic sheath which is formed of a single strip of metallic tape having portions adjacent its side edges positioned against each other side by side and enclosing a material desirable in welding, and is thereby distinguished from prior rods which have the side edges of the sheath either abutting or slightly spaced. It will be readily appreciated that a rod formed in this manner is quite stiff, although a comparatively thin sheath can be employed, a stiff rod being advantageous in facilitating the positioning of the hot end of the rod on the work and the shifting of the molten deposited metal.

It will be understood that various changes may be made in the detail of construction without departing from the spirit or scope of the invention as defined by the appended claims.

I claim:

1. The method of making welding rods comprising taking a metallic tape which contains iron, depositing a material desirable in welding upon the tape, folding the tape about the material to cause it to enclose the material and to have its side edges overlapping without forming an abutment for the side edges, and causing the side edges of the tape to overlap each other as far as possible, thus causing the tape to enclose the material therein quite tightly.

2. The method of making welding rods comprising taking a metallic tape, forming the tape into a channel, depositing a material desirable in welding in the channel, causing the tape to enclose the material by having the portions of the tape adjacent its side edges engage each other without forming abutments for the side edges of the tape, and causing the tape to enclose the material tightly by moving the sides of the channel toward each other and causing the engaging surfaces adjacent the sides of the tape to be as great as possible.

3. The method of making welding rods comprising taking a metallic tape containing iron, forming it into a channel, depositing a material desirable in welding in the channel, and causing the tape to enclose the material by causing its side edges to overlap each other as far as will be permitted by the material, thus causing the tape to tightly enclose the material.

4. The method of making welding rods which consists of taking a metallic tape containing iron, moving the tape longitudinally, depositing a material desirable in welding thereon during the longitudinal movement of the tape, and causing the tape to enclose the material by causing the side edges of the tape to overlap each other without forming abutments for the side edges.

5. The method of making welding rods which consists of taking a metallic tape containing iron, moving the tape longitudinally, depositing a material desirable in welding thereon during the longitudinal movement of the tape, and causing the tape to enclose the material by causing the side edges of the tape to overlap each other by as great an amount as will be permitted by the material.

6. A welding rod comprising a metallic tape containing iron, which is bent scroll shape in cross section with its side edges overlapping each other and portions adjacent its side edges contacting, and a material desirable in welding enclosed in the tape.

7. A welding rod comprising a steel tape which is bent scroll shape in cross section having its side edges overlapping each other and portions adjacent its side edges contacting, and an alloy enclosed in the tape.

In testimony whereof I have signed my name to this specification.

WINSTON F. STOODY.